(12) United States Patent
Zhang et al.

(10) Patent No.: US 8,503,768 B2
(45) Date of Patent: *Aug. 6, 2013

(54) SHAPE DESCRIPTION AND MODELING FOR IMAGE SUBSCENE RECOGNITION

(75) Inventors: Ximin Zhang, San Jose, CA (US);
Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 342 days.

This patent is subject to a terminal disclaimer.

(21) Appl. No.: 12/975,950

(22) Filed: Dec. 22, 2010

(65) Prior Publication Data
US 2012/0163706 A1 Jun. 28, 2012

(51) Int. Cl.
*G06K 9/62* (2006.01)

(52) U.S. Cl.
USPC .......................................................... 382/159

(58) Field of Classification Search
USPC .......................................................... 382/159
See application file for complete search history.

(56) References Cited

U.S. PATENT DOCUMENTS

| 6,956,961 | B2 | 10/2005 | Cong et al. |
| 2006/0008151 | A1 | 1/2006 | Lin et al. |
| 2010/0098342 | A1 | 4/2010 | Davis et al. |
| 2012/0128237 | A1* | 5/2012 | Wang et al. ................... 382/159 |

OTHER PUBLICATIONS (Serge Belongie, Color-And-Texture-Based Image Segmentation Using EM and ITs Application to Content-Basd Image Retrieval,ICCV'98).*

* cited by examiner

*Primary Examiner* — Samir Ahmed
*Assistant Examiner* — Totam Le
(74) *Attorney, Agent, or Firm* — John P. O'Banion

(57) ABSTRACT

A method and apparatus is described here that categorizes images by extracting a subscene and describing the subscene with a top level feature vector and a division feature vector, which are descriptions of edge gradient classifications within rectangular bounding boxes. By filtering subscene feature vectors in images with a Gaussian mixture based model pool (obtained in a subscene modeling phase), the images may be categorized (in an subscene recognition phase) with probabilities relating to each subscene. Higher probabilities are likelier correlations. The device may be a single or multiple core CPU, or parallelized vector processor for characterizing many images. The images may be photographs, videos, or video stills, without restriction. When used real-time, the method may be used for visual searching or sorting.

20 Claims, 11 Drawing Sheets

SHAPE DESCRIPTION AND MODELING FOR IMAGE SUBSCENE RECOGNITION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image classification, and more particularly to image classification using subscene characterization. This invention relates to an apparatus and method for processing pictures, more particularly, to an apparatus and method for intrinsic image shape feature extraction and subscene recognition.

2. Description of Related Art

Image classification and object detection been investigated for many years. Image classification approaches have ranged from image retrieval by using color histogram in 1990s, to image matching using Scale-Invariant Feature Transform (or SIFT). However, currently available techniques still remain far away from customer expectations of non-expert image classification and object detection. Except for a few very well defined problems, such as face recognition, the problem of general image classification and object detection remains largely unsolved.

BRIEF SUMMARY OF THE INVENTION

An aspect of the invention is an image classification apparatus, comprising: a computer; and means for shape classifying an input image using the computer. The means for shape classifying may comprise a programming executable on the computer for performing steps comprising: subscene modeling; and performing subscene recognition. The subscene modeling step may comprise programming for executing steps further comprising: segmenting a training image from an image training set into one or more training subscenes based on an input pool of N subscene categories; extracting a set of training subscene feature vectors for each of the subscenes corresponding to the input pool of N training subscene categories; and forming a subscene model pool comprising training subscene feature vectors for each of the input pool of N training subscene categories.

The computer may be capable of executing the means for shape classifying either sequentially or at least partially in parallel.

In the apparatus above, the performing subscene recognition step may comprise: segmenting the input image into a set of input subscenes; extracting shape features corresponding to each of the input subscenes to form a set of extracted subscene shape feature vectors; and filtering the set of extracted subscene shape feature vectors against the subscene model pool to form a filtered output. The performing subscene recognition step may further comprise selecting the set of extracted subscene categories corresponding to one or more of the largest filtered outputs.

In the apparatus above, one may further set a working subscene selected from the group consisting of: the training subscenes and the input subscenes; and dividing the working subscene into a set of divisions, describing each working subscene by a concatenated subscene shape feature vector $\vec{V}_{subscene} = (\vec{V}_{Top}, \vec{V}_{Division})$ comprising: a top level feature vector $\vec{V}_{Top}$; and a division level feature vector $\vec{V}_{Division}$.

The top level feature vector $\vec{V}_{Top}$ may be calculated for each working subscene using steps comprising: forming a bounding box surrounding the working subscene; detecting a set of working subscene edge points and their associated gradients within the bounding box in the luminance channel (Y domain); calculating a 5-dimensional (5D) top level feature vector, comprising:

$\vec{V}_{Top} = (f_{Compactness}, f_{Horizontal}, f_{45°}, f_{Vertical}, f_{135°})$, where, in the bounding box, $f_{compactness}$ is calculated by $$f_{compactness} = \frac{N}{|X_A - X_B| * |Y_A - Y_B|},$$

$f_{Horizontal}$ is a normalized number of horizontal edge points $$f_{Horizontal} = \frac{N_{Horizontal}}{N_{Normalization}},$$

$f_{45°}$ is a normalized number of 45° edge points $$f_{45°} = \frac{N_{45°}}{N_{Normalization}},$$

$f_{Vertical}$ is a normalized number of vertical edge points $$f_{Vertical} = \frac{N_{Vertical}}{N_{Normalization}},$$

$f_{135°}$ is a normalized number of 135° edge points $$f_{135°} = \frac{N_{135°}}{N_{Normalization}},$$

and $N_{Normalization}$ is a normalization factor that is the larger of a length of a height or width of the bounding box:

$$N_{Normalization} = \begin{cases} |X_A - X_B| & \text{if}\, |X_A - X_B| \geq |Y_A - Y_B| \\ |Y_A - Y_B| & \text{if}\, |X_A - X_B| < |Y_A - Y_B|, \end{cases}$$

where N denotes the total number of pixels of the working subscene in the bounding box, $(X_A, Y_A)$ denotes an upper left corner position of the bounding box; and $(X_B, Y_B)$ denotes a lower right corner position of the bounding box.

Each of the subscene edge point may be classified as: a horizontal edge point if the associated gradient lies between −22.5° and 22.5°; a vertical edge point if the associated gradient lies between 67.5° and 112.5°; a 45° edge point if the associated gradient lies between 22.5° and 67.5°; and a 135° edge point if the associated gradient lies between 112.5° and 157.5°.

The image classification apparatus above may further comprise: dividing a bounding box surrounding the working subscene into three horizontal and three vertical subscene divisions $D_i$, where i∈1, 2, 3, 4, 5, 6, 7, 8, 9; detecting a set of division edge points of the working subscene and their associated gradients within each subscene division in the luminance channel (Y domain); forming a 5-dimensional (5D) division feature vector $\vec{D}_i = (f_{Compactness}, f_{Horizontal}, f_{45°}, f_{Vertical}, f_{135°})|_{D_i}$ for each of the i subscene divisions, where, in subscene division $D_i$, $f_{Compactness}$ is calculated by $$f_{Compactness} = \frac{N}{|X_A - X_B| * |Y_A - Y_B|},$$

$f_{Horizontal}$ is a normalized number of horizontal edge points $$f_{Horizontal} = \frac{N_{Horizontal}}{N_{Normalization}},$$

$f_{45°}$ is a normalized number of 45° edge points $$f_{45°} = \frac{N_{45°}}{N_{Normalization}},$$

$f_{Vertical}$ is a normalized number of vertical edge points $$f_{Vertical} = \frac{N_{Vertical}}{N_{Normalization}},$$

$f_{135°}$ is a normalized number of 135° edge points $$f_{135°} = \frac{N_{135°}}{N_{Normalization}},$$

and $N_{Normalization}$ is a normalization factor that is the larger of a length of a height or width of the subscene division:

$$N_{Normalization} = \begin{cases} |X_A - X_B| & \text{if}\, |X_A - X_B| \geq |Y_A - Y_B| \\ |Y_A - Y_B| & \text{if}\, |X_A - X_B| < |Y_A - Y_B|, \end{cases}$$

where N denotes the total number of working subscene pixels in the subscene division, $(X_A, Y_A)$ denotes an upper left corner position of the subscene division; and $(X_B, Y_B)$ denotes a lower right corner position of the subscene division.

Each working subscene division edge point may be classified as: a horizontal edge point if the associated gradient lies between −22.5° and 22.5°; a vertical edge point if the associated gradient lies between 67.5° and 112.5°; a 45° edge point if the associated gradient lies between 22.5° and 67.5°; and a 135° edge point if the associated gradient lies between 112.5° and 157.5°.

The concatenated 45-dimensional (45D) division level feature vector may be formed from the 9 individual 5D division feature vectors as $$\vec{V}_{Division} = (\vec{D}_1, \vec{D}_2, \vec{D}_3, \vec{D}_4, \vec{D}_5, \vec{D}_6, \vec{D}_7, \vec{D}_8, \vec{D}_9)$$

The detecting steps above may comprise using Canny edge detection.

The subscene modeling step may comprise steps for selecting an optimal number of clusters in the step of forming the subscene model pool.

The means for shape classifying may be stored on a computer readable medium. In the performing subscene recognition step, the input image may be one of a set of photographs.

In another aspect of the invention, an image classification apparatus may comprise: a computer; and a programming executable on the computer for shape classifying an input by performing steps comprising; wherein said shape classifying comprises: performing subscene recognition; and steps for performing subscene modeling; wherein said steps for performing subscene modeling comprises: segmenting a training image, from an image training set, into one or more subscenes based on an input pool of N training subscene categories; extracting a set of training subscene feature vectors for each of the subscenes corresponding to the input pool of N training subscene categories; and forming a subscene model pool comprising subscene feature vectors for each of the input pool of N training subscene categories.

The programming executable may be stored on a computer readable medium as a program in either source code or object code.

In yet another aspect of the invention, an image classification apparatus may comprise: a computer; and a programming executable on the computer for performing one or more steps comprising shape classifying an input image; wherein the shape classifying comprises programming for executing steps comprising: subscene modeling; and performing subscene recognition. A computer readable medium may be used for storing the programming executable.

In another aspect of the invention, an image classification apparatus, may comprise: a computer; and a program executable on the computer for classifying an input; wherein said classifying comprises: performing subscene recognition; and steps for performing subscene modeling; wherein said steps for performing subscene modeling comprises: segmenting an input image training set from an image database into one or more subscenes based on an input pool of N subscene categories; extracting a set of training shape feature vectors for each of the subscenes corresponding to the input pool of N subscene categories; and forming a subscene model pool for the input pool of N subscene categories.

The program executable above may be stored on a computer readable medium as a program in either source code or object code.

In another aspect of the invention, an image classification apparatus may comprise: a computer; and a programming executable on the computer for performing one or more steps comprising classifying an input image; wherein the classifying comprises programming for executing steps comprising: subscene modeling; and performing subscene recognition.

A computer readable medium may be used for storing the programming executable above.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

Figure 7B:
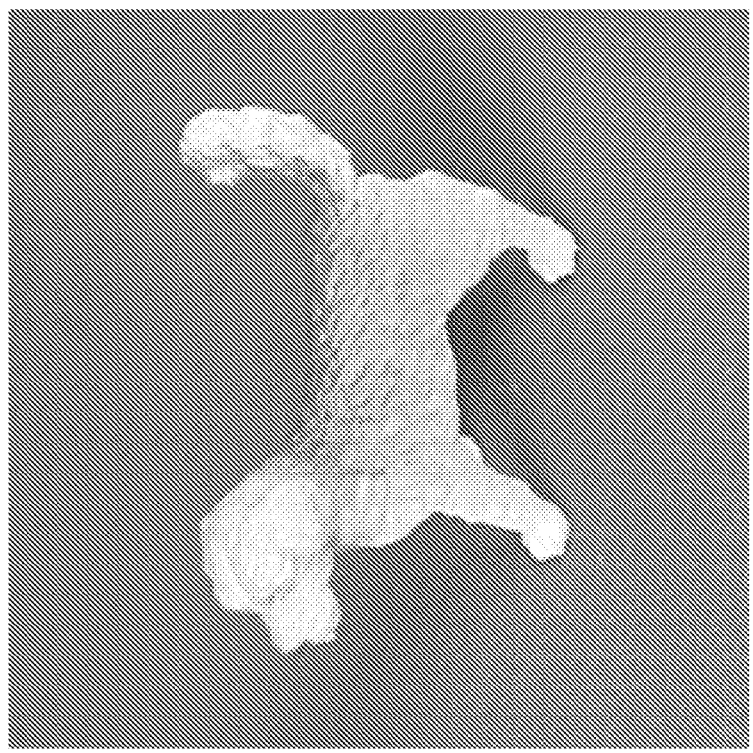
Figure 7A:
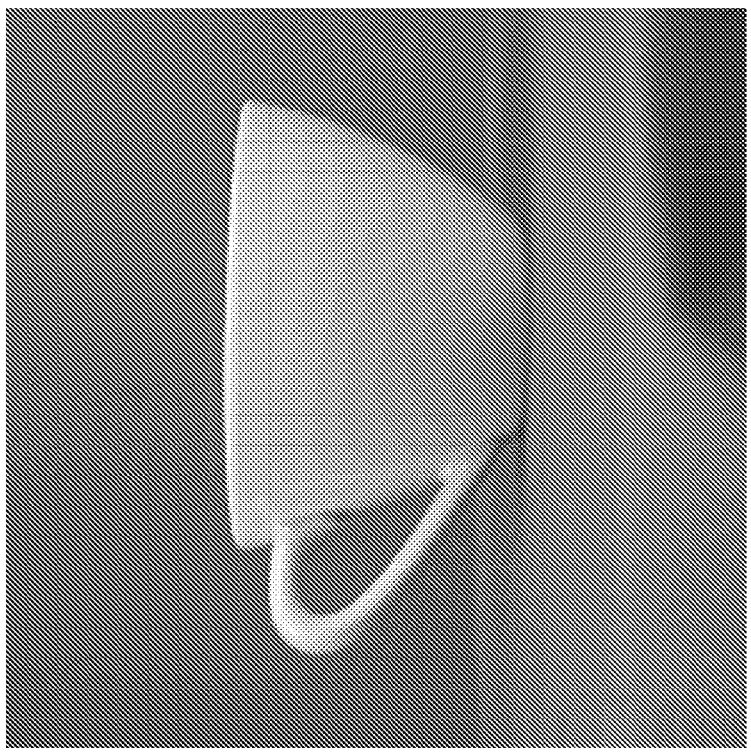
Figure 7D:
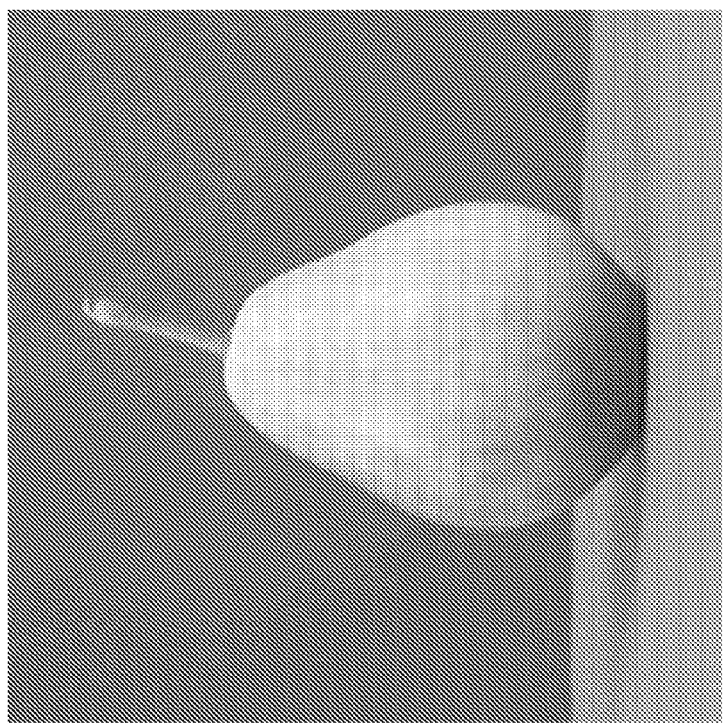
Figure 7C:
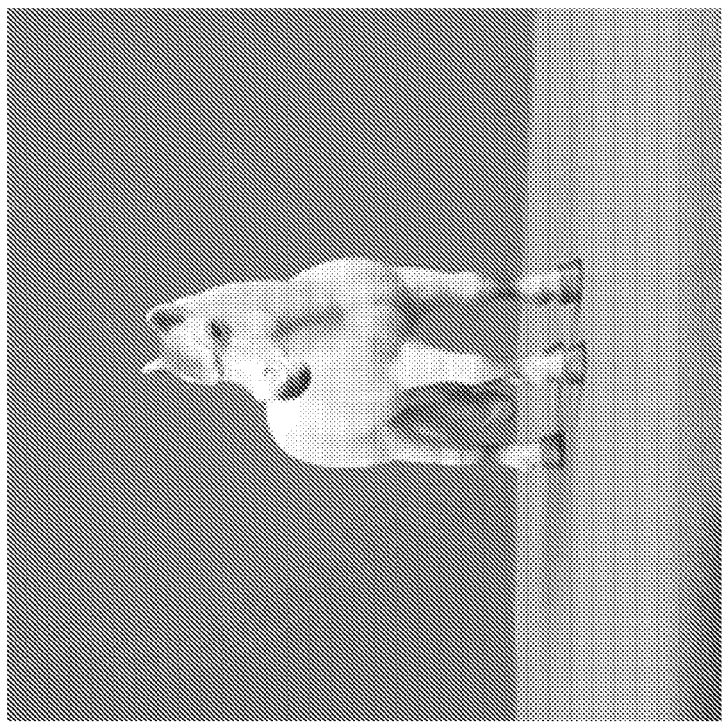
Figure 7F:
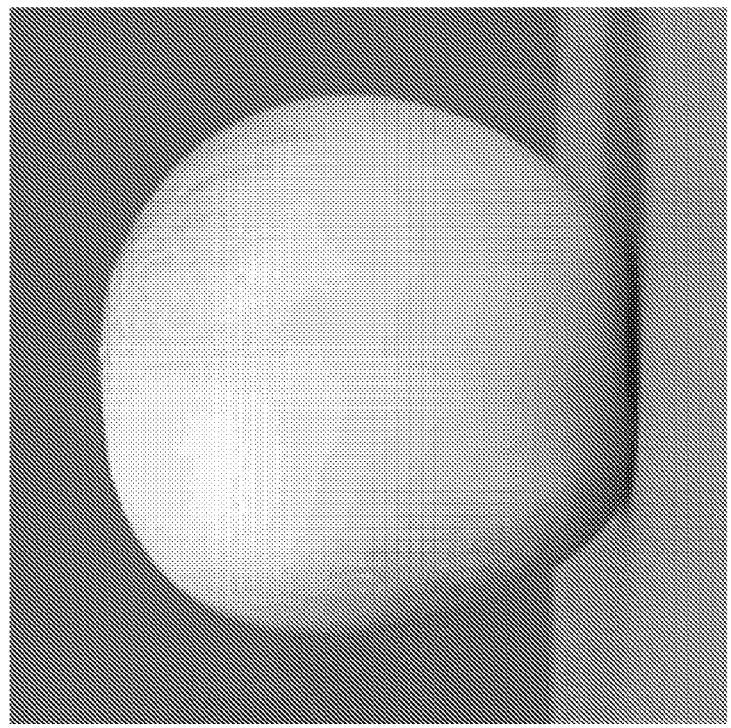
Figure 7E:
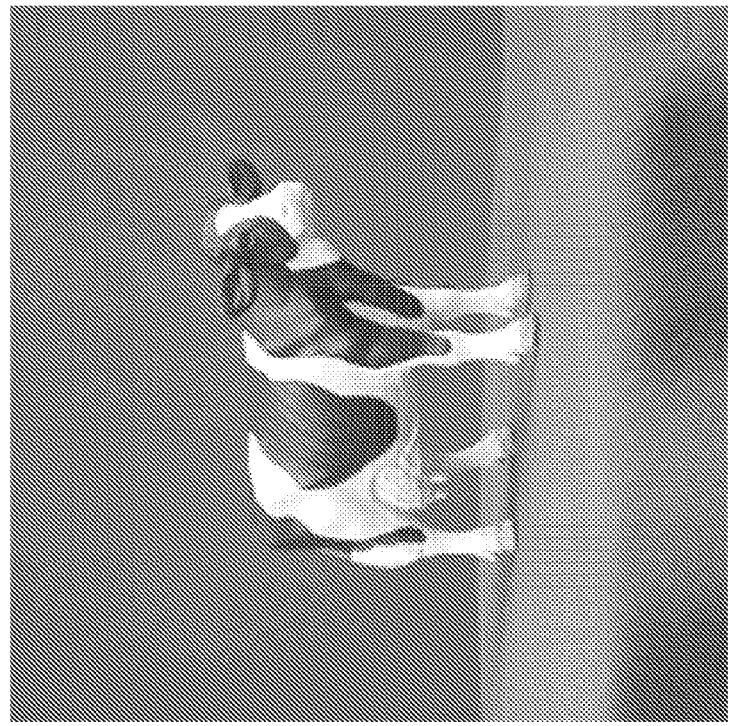

FIG. 7A is an image of a computer generated cup.
FIG. 7B is an image of a computer generated dog.
FIG. 7C is an image of a computer generated horse.
FIG. 7D is an image of a computer generated pear.
FIG. 7E is an image of a computer generated cow.
FIG. 7F is an image of a computer generated apple.

Figure 8:
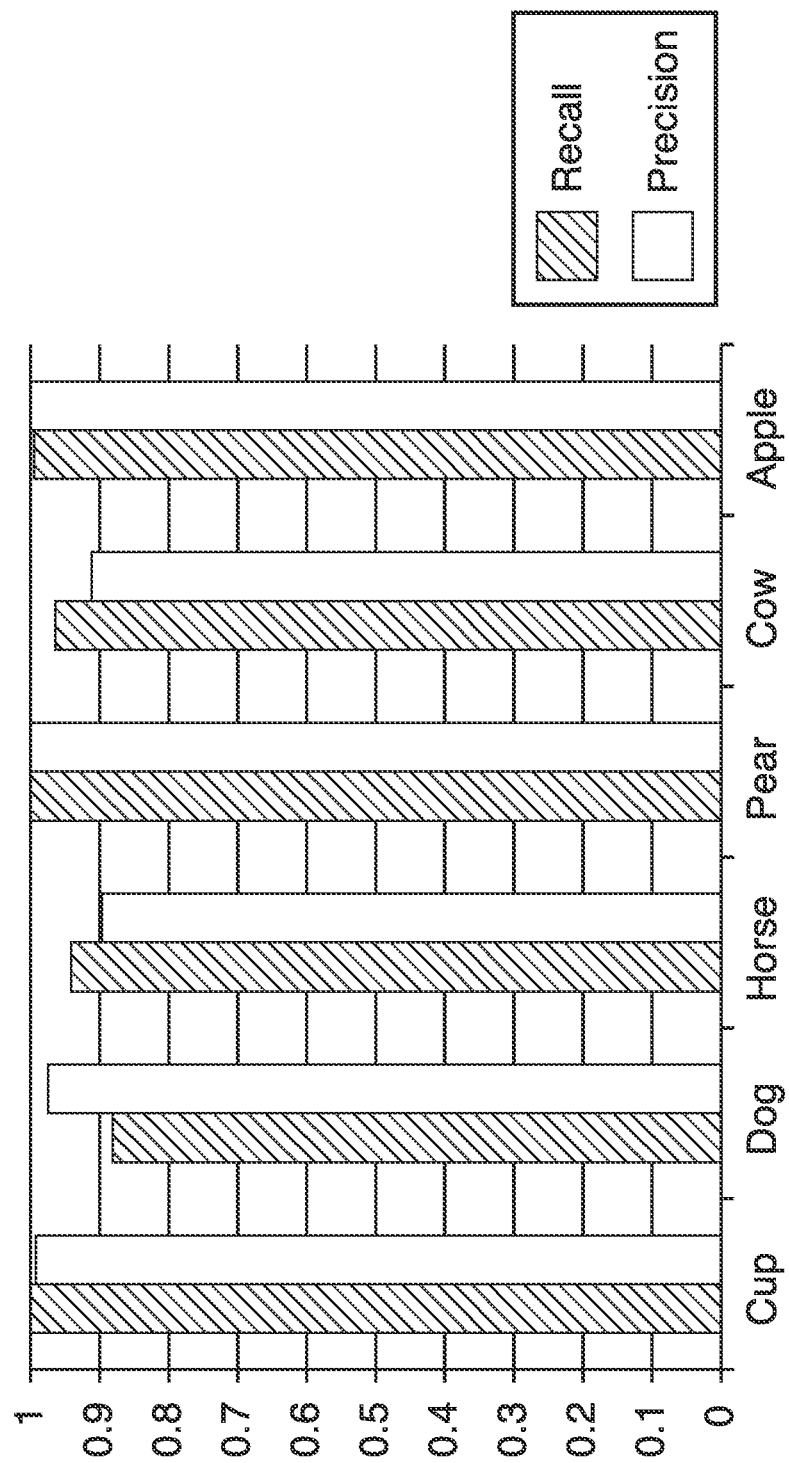

FIG. 8 is a bar graph of recall and precision of an images database represented in FIGS. 7A through 7F.

DETAILED DESCRIPTION OF THE INVENTION

A. Introduction

With increased computational hardware now available, it becomes possible to create processes that were previously inconceivable. More and more intelligent features that emulate human capabilities are desirable for new products, thereby improving and easing human-machine interactions.

In automobiles, for instance, people would like automatic detection of people behind or in front of the car to prevent accidents. Users would also like a camera or video recorder to automatically determine an optimal setup given ambient environmental conditions to take the best possible photographs and videos. In computers, users would also want their computers to automatically categorize personal or business photo collections. For video recordings, users would be intrigued with a camcorder that could automatically remove meaningless scenes and compile an attractive video clip. All of the foregoing applications, and many other related applications, cannot be realized without accurate image classification and object detection.

Since image classification and object detection is an area of great interest in both research and application, it has been investigated for many years. Many image classification approaches have been proposed, ranging from image retrieval by using color histogram in 1990s, to image matching using Scale-Invariant Feature Transform (or SIFT), which is an algorithm in computer vision used to detect and describe local features in images. However, extant techniques remain still far away from customer expectations of non-expert image classification and object detection. Except for a few very well defined problems, such as face recognition, the problem of general image classification and object detection remains largely unsolved.

Scene recognition and representation is an important branch in general image classification and object detection. Good scene recognition and representation techniques can greatly improve the performance of many computer vision applications, such as image categorization (natural grouping of images instead of clusters based on time or simple text descriptions), image retrieval (used to find images in archives based on visual similarity). It can also provide contextual information to improve the object recognition. For instance, if we know the scene represents a city street, then the probability of a vehicle will be much higher than a ship.

Currently, one-to-many words are typically used to describe a given scene. However, such annotations often lead to very different scenes having the same description. To address this problem here, an image is described with a set of meaningful regions or objects with certain spatial relationships. In this invention, the term "subscene" is used to represent a meaningful region or object within an image or video scene.

The aim here is to detect and classify each subscene within an image, and then to represent the subscene with a semantic label of low complexity without any human intervention. To do so, an image shape extraction scheme is developed to extract the subscene shape features. By combining these subscene shape features, a multi-dimensional shape feature vector is generated for each subscene. Then a Gaussian mixture model is used to represent the subscene with the shape feature vector as the variable.

The parameters of the Gaussian mixture model are obtained by using an Expectation Maximization (EM) algorithm on all of the training data selected from an image database set. After the models for each subscene feature category are obtained, the subscene classification is done by voting on each of the subscene categories. The model with the maximum output is selected as the best description.

B. Overall Method Description

Figure 1A:
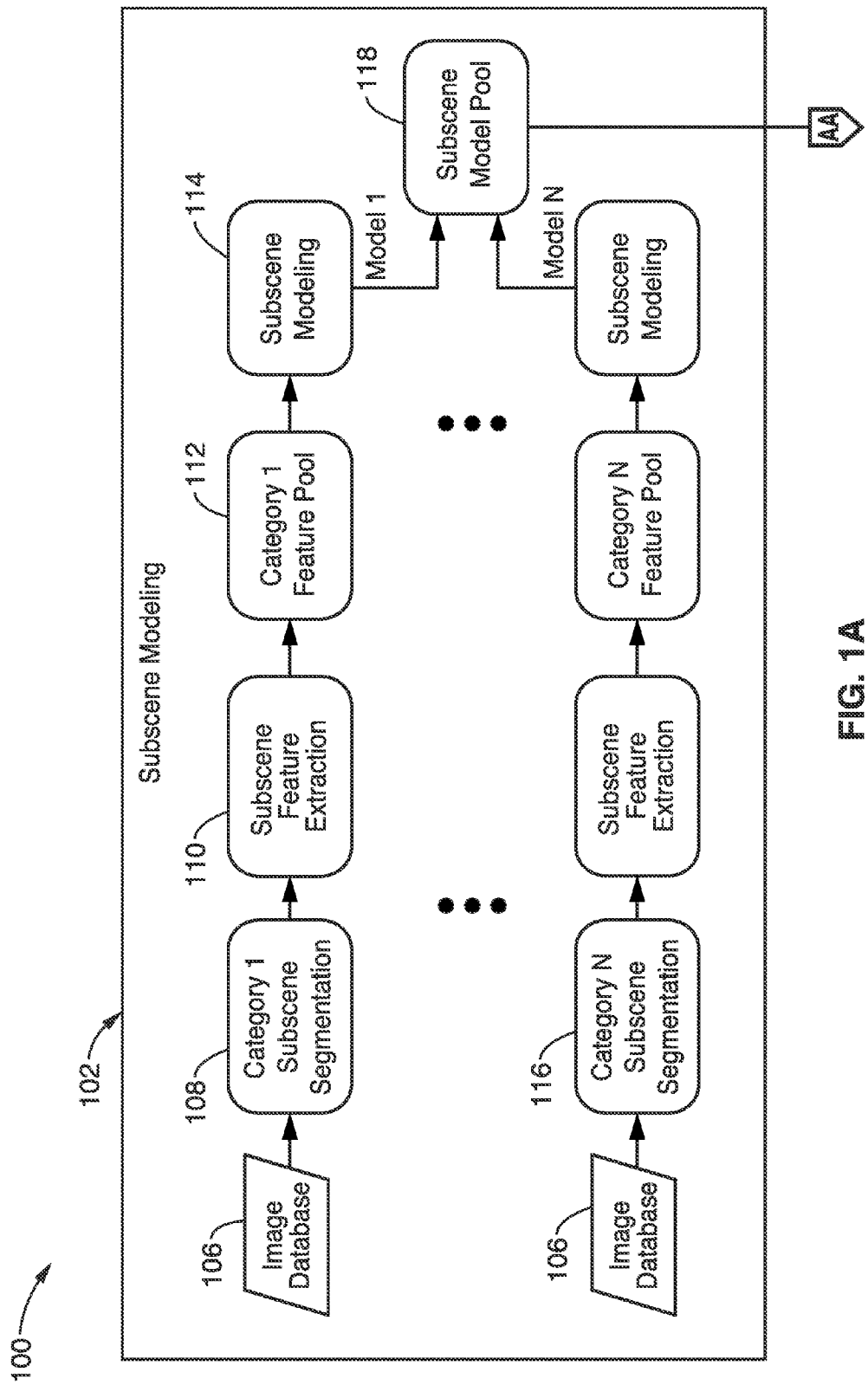
FIG. 1A is a flow chart of an overall method of shape-based subscene modeling and recognition, where the modeling section is connected with the recognition section of FIG. 1B.
Figure 1B:
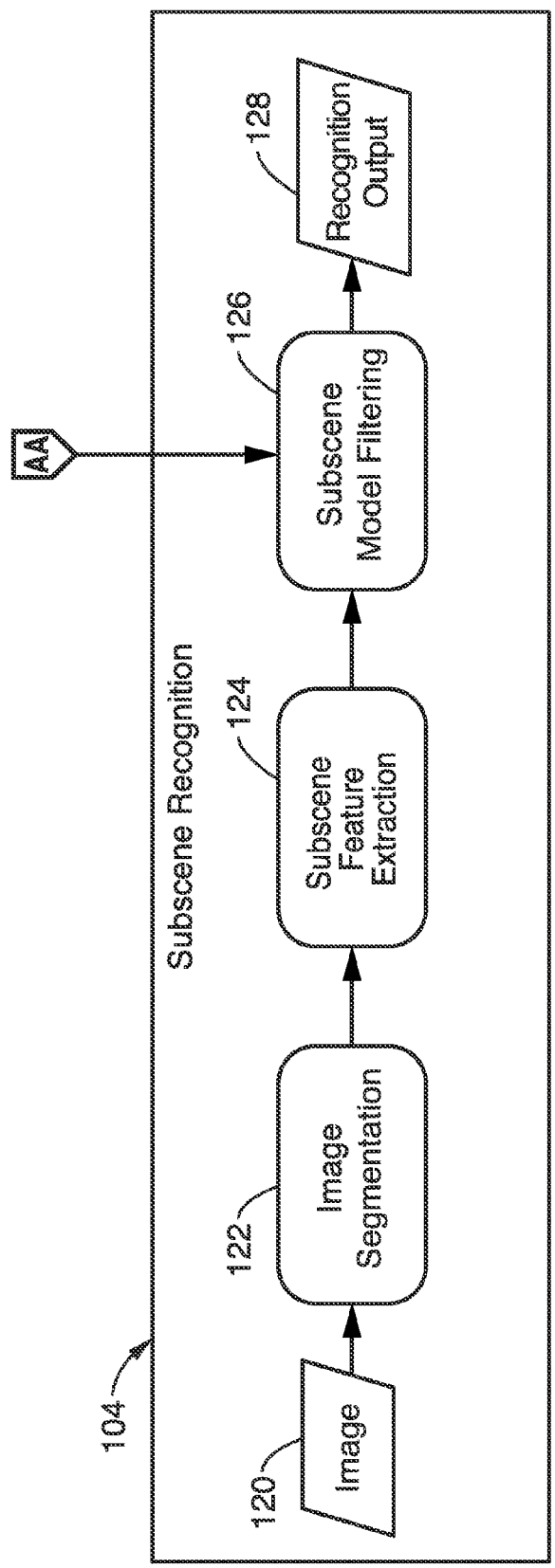
FIG. 1B is a flow chart of an overall method of shape-based subscene modeling and recognition, where the recognition section is connected with the modeling section of FIG. 1A.

Refer now to FIGS. 1A and 1B, which form a flowchart of the overall architecture of the method 100. It consists of two sections: a subscene modeling section 102 and a subscene recognition section 104. In the subscene modeling section 102, the subscene representation model is obtained by the following procedure:

1. In the first step, the images comprising an image database 106 are first segmented 108 based on subscene categories to form subscenes. As an example, without limitation, if category 1 subscene represents a mountain, then the mountain within each image is segmented out as an independent subscene.

2. Each subscene is divided into a set of fixed size image regions, and the shape features from the image regions are correspondingly extracted into one or more shape feature vectors 110 respectively.

3. After all the input mountain subscenes in the image database 106 are processed the extracted features are stored in the Category 1 feature pool 112.

4. Then, features in the pool are used to learn a shape representation of the subscene model in the module Subscene Modeling 114.

5. Steps 1 to 4 are repeated until all the subscene models from Category 1 through Category N 116 are obtained. These individual N models are then stored in a Subscene Model Pool 118.

Now in the subscene recognition section 104 of FIG. 1B, subscene recognition is conducted as follows:

1. An input image 120 is first segmented 122 into a set of subscenes.

2. Each subscene is processed to generate a shape feature vector representative of the subscene in the "Subscene Feature Extraction" block 124.

3. Each extracted shape feature vector 124 is filtered 126 by all the subscene models present in the subscene model pool 118 in module "Subscene Model Filtering" and the resulting subscene category with the largest numeric filtering output 128 is selected.

4. Steps 2 to 3 above are repeated until all the subscenes in the input image 120 are processed.

The technical details for these methods and an example embodiment will be described in the following sections.

C. Shape Feature Extraction

In the method described herein, a shape feature comprises two kinds of features: a top level shape feature and a division level feature. These will be described in detail below. In this invention, features are extracted in the YCbCr domain. Since most of the images are stored in RGB format, typically a format transformation from another format to YCbCr must be performed prior to feature extraction.

Figure 2:
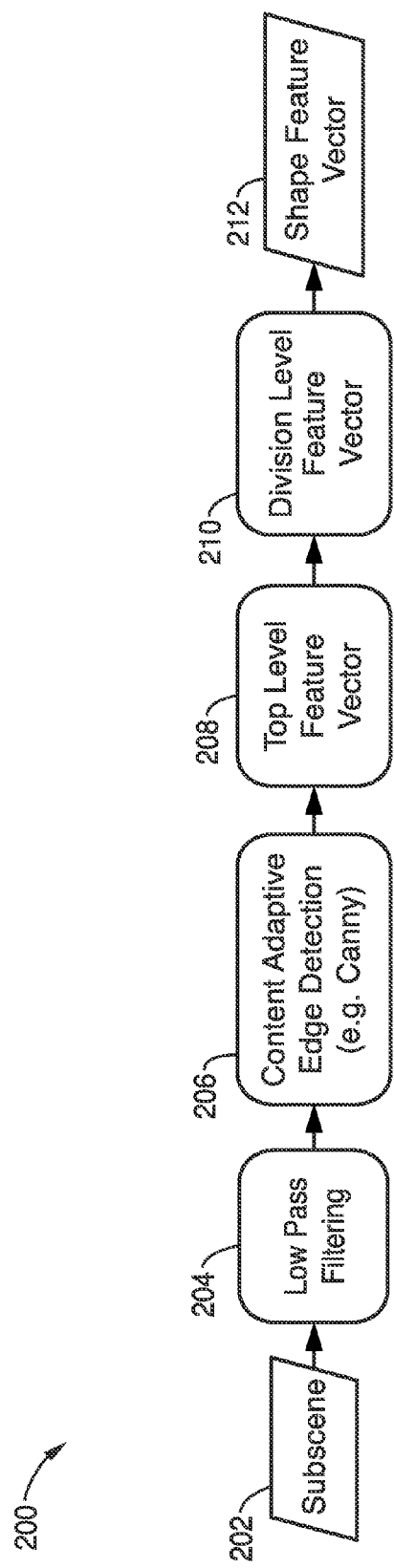
FIG. 2 is a flow chart of an image shape feature extraction method.

Refer now to FIG. 2, which is a flow chart illustrating the subscene shape feature extraction method 200, which is done as follows.

1. Initially, a subscene 202 is input.

2. Low pass filtering 204 is applied to the subscene 202 to reduce any noise present in the subscene 202. Such low pass filtering may be Gaussian, or other low pass filter. The "Content Adaptive Edge Detection" module 206 may be processed either concurrently (if processed with parallel hardware), or at a different time (using traditional computational methods without substantial parallelism). One example of the "Content Adaptive Edge Detection" module 206 may be the Canny edge detection (developed by John F. Canny.)

After the "Content Adaptive Edge Detection" module 206 a top level feature vector 208 is generated, followed by a division level feature vector 210. By combining both the top level feature extraction 208 and the division level feature extraction 210, a shape feature output 212 is formed. This will be explained in more detail below.

Figure 3:
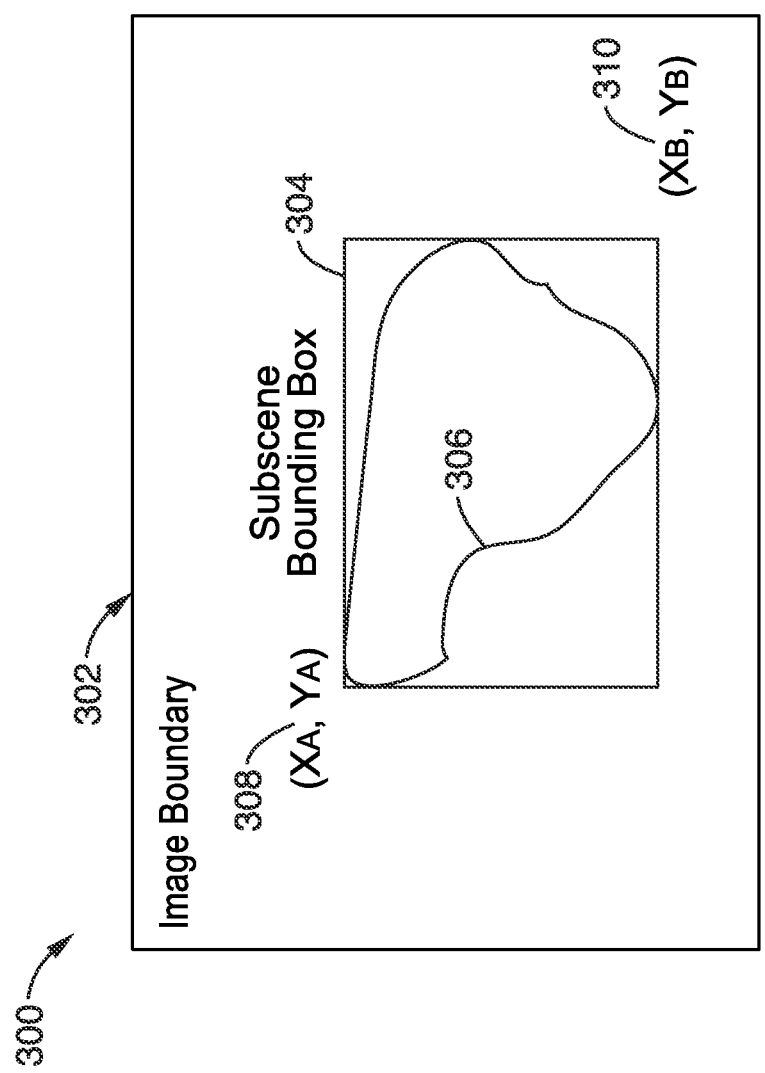
FIG. 3 is a diagram of bounding box surrounding a shape to have shape features extracted.

3. Refer now to FIG. 3, which is an illustration of an image 300 that has a shape feature to be extracted. In this invention, for each subscene in the low passed image extracted from an input image 302 as follows:

For the input subscene region, a rectangular bounding box 304 is first drawn to surround the subscene region 306. This is readily accomplished by taking the maximum and minimum values of the border of the subscene on the X and Y axes.

Let coordinates $(X_A, Y_A)$ denote 308 the upper left corner position of the bounding box 304 and let coordinates $(X_B, Y_B)$ denote 310 the lower right corner position of the bounding box 304. With these initial coordinates, the width of the bounding box 304 may be calculated as $|X_A - X_B|$ and the height of the bounding box 304 can be calculated as $|Y_A - Y_B|$.

4. The content adaptive edge detection is applied to the rectangular bounding box 304 as follows.

a. Calculate the gradients of all pixels in the rectangle bounding box area and their respective gradient amplitudes.

c. Within the bounding box, calculate the average value of the gradient amplitude if it is larger than a fixed threshold as following, where K is the number of gradients that meet the condition $\|Gradient(i)\| > T$, where T is a fixed threshold and T=10 in the example implementation, as follows:

$$\text{Average} = \frac{1}{K} \sum_{\substack{\|Gradient(i)\| > T \\ i \in BoundingBox}} \|Gradient(i)\|.$$

c. Use the Average value as the upper limit and use half the Average value as the lower limit to find the Canny edge points. The Canny edge detection process widely found in public domain references.

d. After all the edge points are obtained, the edge points are then categorized into four categories: horizontal edge (between −22.5° and 22.5°), vertical edge (between 67.5° and 112.5°), 45° edge (between 22.5° and 67.5°), and 135° edge (between 112.5° and 157.5°).

5. In the top level feature vector extraction, five features are calculated as follows:

a. The first is the subscene compactness feature. Referring still to FIG. 3, the subscene region compactness is calculated as follows:

$$f_{Compactness} = \frac{N}{|X_A - X_B| * |Y_A - Y_B|}$$

where N denotes the total number of pixels in the subscene region, $(X_A, Y_A)$ denotes the upper left corner position of the bounding box 304 and $(X_B, Y_B)$ denotes the lower right corner position of the bounding box 304.

b. The second feature is the normalized number of horizontal edge points as follows:

$$f_{Horizontal} = \frac{N_{Horizontal}}{N_{Normalization}}.$$

c. The third feature is the normalized number of 45° edge points as follows:

$$f_{45°} = \frac{N_{45°}}{N_{Normalization}}.$$

d. The fourth feature is the normalized number of vertical edge points as follows:

$$f_{Vertical} = \frac{N_{Vertical}}{N_{Normalization}}.$$

e. The fifth feature is the normalized number of 135° edge points as follows:

$$f_{135°} = \frac{N_{135°}}{N_{Normalization}}.$$

f. The normalization factor $N_{Normalization}$ is the larger of the length of the bounding box height or width as follows:

$$N_{Normalization} = \begin{cases} |X_A - X_B| & \text{if} |X_A - X_B| \geq |Y_A - Y_B| \\ |Y_A - Y_B| & \text{if} |X_A - X_B| < |Y_A - Y_B|. \end{cases}$$

g. By combining the above features, a 5-dimensional (5D) top level feature vector $\vec{V}_{Top}$ may be obtained as follows:

$$\vec{V}_{Top} = (f_{Compactness}, f_{Horizontal}, f_{45°}, f_{Vertical}, f_{135°})$$

6. In division level feature extraction, the bounding box 304 previously shown in FIG. 3 is evenly divided into 9 parts to produce FIG. 4.

Figure 4:
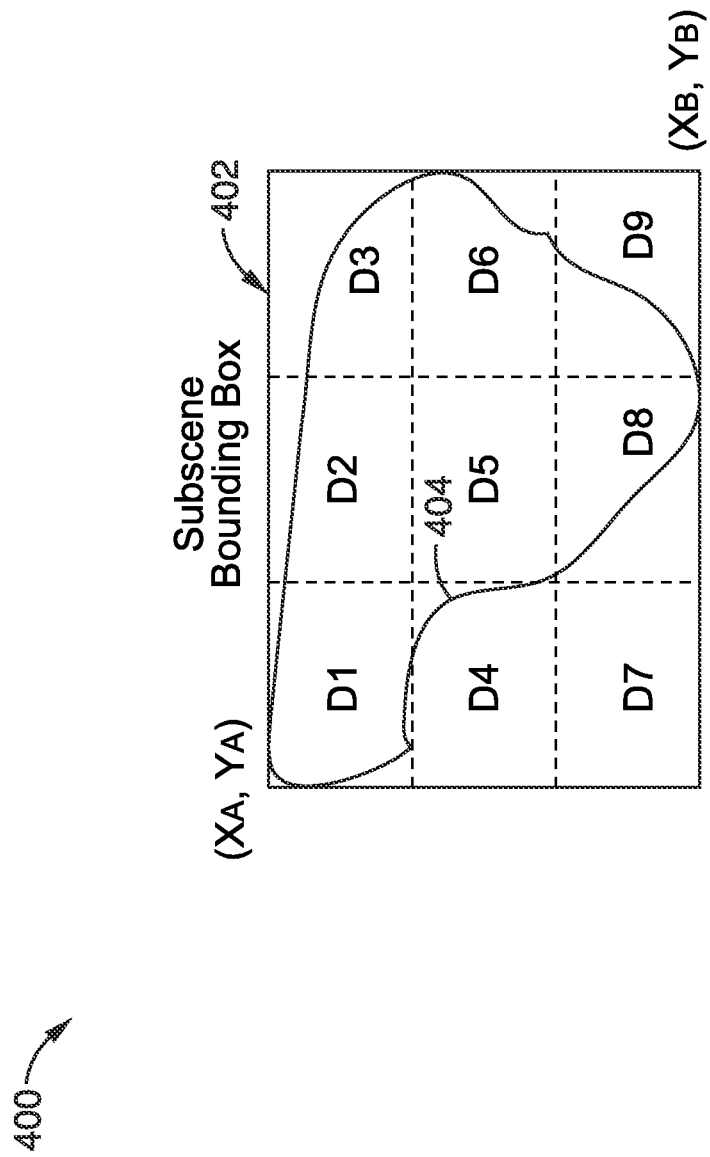
FIG. 4 is a diagram of subscene division used to subdivide the shape of FIG. 3.

Refer now to FIG. 4, which shows a division of the bounding box 400. Here, the bounding box 402, surrounding the subscene region 404, has been vertically and horizontally divided into three equal sections, producing subdivisions D1, D2, D3, D4, D5, D6, D7, D8 and D9. Then, the exactly same procedures previously used in step 5 are applied to each of the i∈1,2,3,4,5,6,7,8,9 subdivisions $D_i$ to produce a representative 5D feature vector for each of the subdivisions as follows:

$$\vec{D}_i = (f_{Compactness}, f_{Horizontal}, f_{45°}, f_{Vertical}, f_{135°})|_{D_i}.$$

Each of the subdivision feature vectors $\vec{D}_i$ are in turn concatenated element by element into a 45-dimensional (45D) vector. The resulting 45D vector is referred to as a division level feature vector as follows:

$$\vec{V}_{Division} = (\vec{D}_1, \vec{D}_2, \vec{D}_3, \vec{D}_4, \vec{D}_5, \vec{D}_6, \vec{D}_7, \vec{D}_8, \vec{D}_9)$$

7. By concatenating the 5D top level shape feature vector elements and 45D division level shape feature vector elements, a 50-dimensional (50D) subscene feature vector $\vec{V}_{subscene}$ is obtained as follows:

$$\vec{V}_{subscene} = (\vec{V}_{Top}, \vec{V}_{Division}).$$

Based on the subscene feature vector $\vec{V}_{subscene}$, a subscene model is developed. The detail is described in the following section.

D. Subscene Modeling Based on Subscene Features

Through many years of investigation, two approaches have been proposed for general object or scene recognition. One approach is discriminatively based, which basically trains classifiers to find decision boundaries in the feature space to separate one class from the others. However, the discrimination approach requires a sufficient amount of training data to achieve a complete description of all others. In reality, the sufficient amount is impossible to achieve. As soon as new data is available, the training must be redone.

The second recognition approach is generatively based. This is different from the previously described classifier based approach in that it only models the target class and assumes all other classes have different distributions. After the generative model is learned from the training data, the probability density of a subscene can be estimated based on the maximum likelihood between the subscene feature vector and the corresponding generative model.

In this invention, the generative approach is used to develop a multivariable Gaussian mixture based subscene model for subscene representation. By using a feature vector $\vec{V}_{subscene}$ having d dimensionality, a multivariable Gaussian distribution can be described as follows:

$$p_k(\vec{V}_{subscene}) = \frac{1}{(2\pi)^{d/2}\|S_k\|^{1/2}} \exp\left(\frac{1}{2}(\vec{V}_{subscene} - \vec{M}_k)^T [S_k]^{-1} (\vec{V}_{subscene} - \vec{M}_k)\right)$$

A Gaussian mixture can be described as:

$$P(\vec{V}_{subscene}; \vec{M}_k, [S_k], w_k) = \sum_{k=1}^{m} w_k p_k(\vec{V}_{subscene}),$$

$$w_k \geq 0, \sum_{k=1}^{m} w_k = 1$$

where m is the number of mixtures or clusters, $\vec{M}_k$ is the mean vector, $[S_k]$ is the norm of the covariance matrix, $\|S_k\|^{1/2}$ is the covariance matrix, $w_k$ is the weight of $k^{th}$ cluster. When the training data and the number of clusters m are known, an expectation-maximization (EM) algorithm is used to estimate the parameters of the Gaussian mixture. Therefore, for fixed training data and m clusters, the parameters $\vec{M}_k$, $[S_k]$, and $w_k$ are fixed. Once the training data is fixed, the key to achieve a good Gaussian mixture model is to find a suitable value for the number of clusters, m. Smaller numbers of clusters m usually generate looser models that have very weak discriminative powers. On the other hand, too large a number of clusters m will generate an over-fit model that can only recognize the training data.

Figure 5:
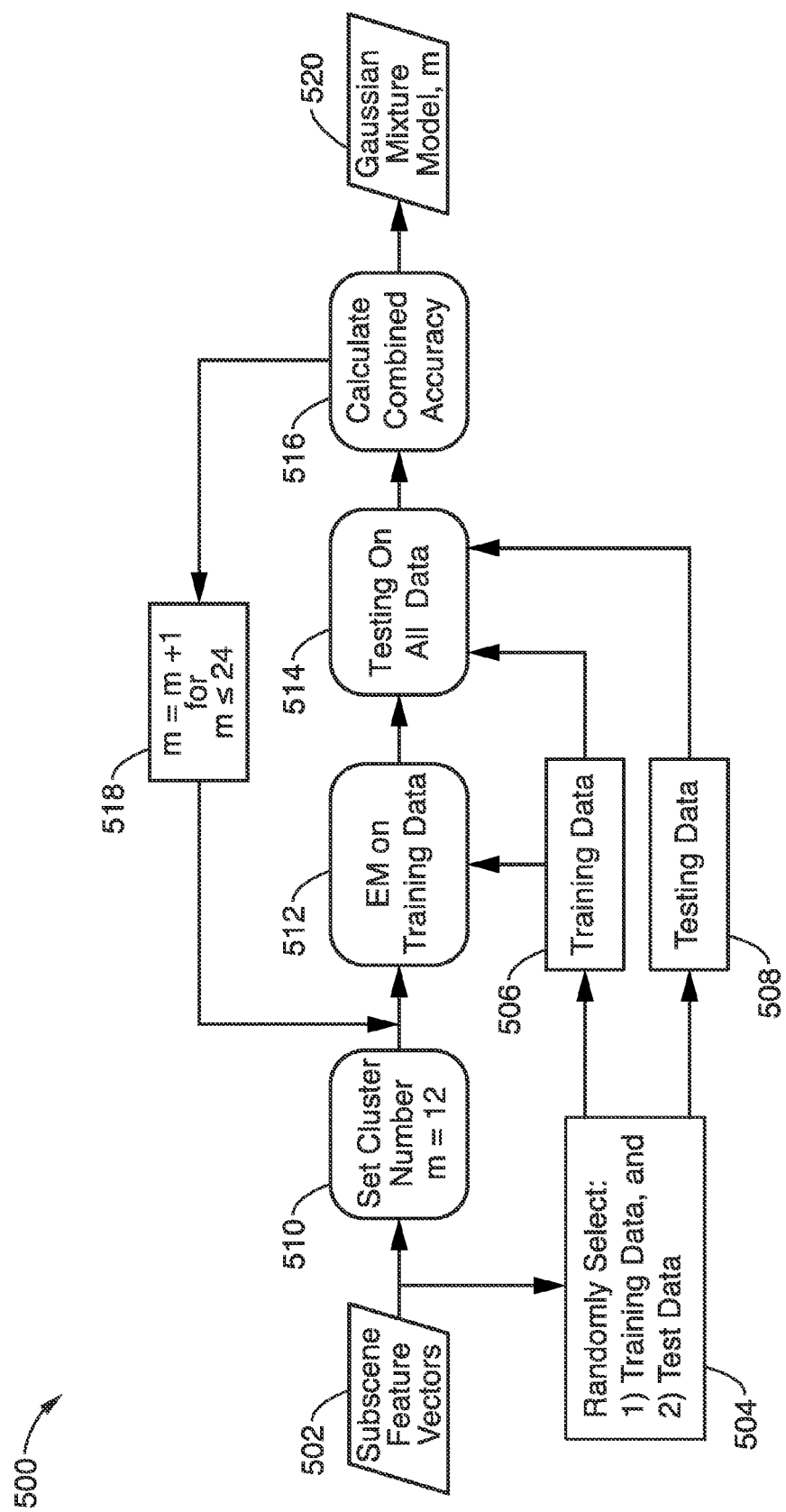
FIG. 5 is a flow chart for determining the optimal number of clusters in the image shape modeling process.

Refer now to FIG. 5, which is a flowchart of the method used to find a suitable number of clusters, m, for subscene modeling 500. Initially, all input subscene feature vectors $\vec{V}_{subscene}$ 502 are randomly divided 504 into training data 506 and testing data 508. The subscene model is then constructed as follows:

1. Initialize a number of clusters equal to a small number index m (where ranges from $12 \leq m \leq 24$ in a current embodiment 510).

2. Apply the expectation-maximization (EM) algorithm 512 with m clusters on the training data 506 to obtain an $m^{th}$ Gaussian mixture model.

3. Test 514: 1) the obtained $m^{th}$ Gaussian mixture model on the training data 506 to obtain a training accuracy rate $Accuracy_{training}(m)$; and 2) the obtained Gaussian mixture model on the testing data 508 to obtain a testing accuracy rate $Accuracy_{testing}(m)$. Calculate the combined accuracy rate $Accuracy_{combined}(m)$ 516 as:

$$Accuracy_{combined}(m) = \begin{cases} Accuracy_{training}(m) + \\ Accuracy_{testing}(m) - \\ c_1 * |Accuracy_{training}(m) - Accuracy_{testing}(m)| \end{cases}$$

where $c_1$ is a weighting parameter that ranges from [0-0.5].

4. Increase the number of clusters m by one (m+1) 518 and repeat the above steps 2-3 until the number of clusters m reaches a maximum threshold (24 in a current embodiment).

5. Select and output 520 the model that has the highest combined $$Accuracy_{combined}(m) \text{ rate as: } \underset{m}{\operatorname{argmax}}(Accuracy_{combined}(m)).$$

E. Subscene Recognition

By using the shape feature extraction and modeling processes described herein, one can generate a representation model for nearly any subscene category. The subscene can be recognized based on a representation model output corresponding to the subscene shape feature. When a new image is obtained, subscene recognition can be used to annotate each region of the image. By combining all subscene regions in an image, a complete representation of an image may be obtained.

Figure 6:
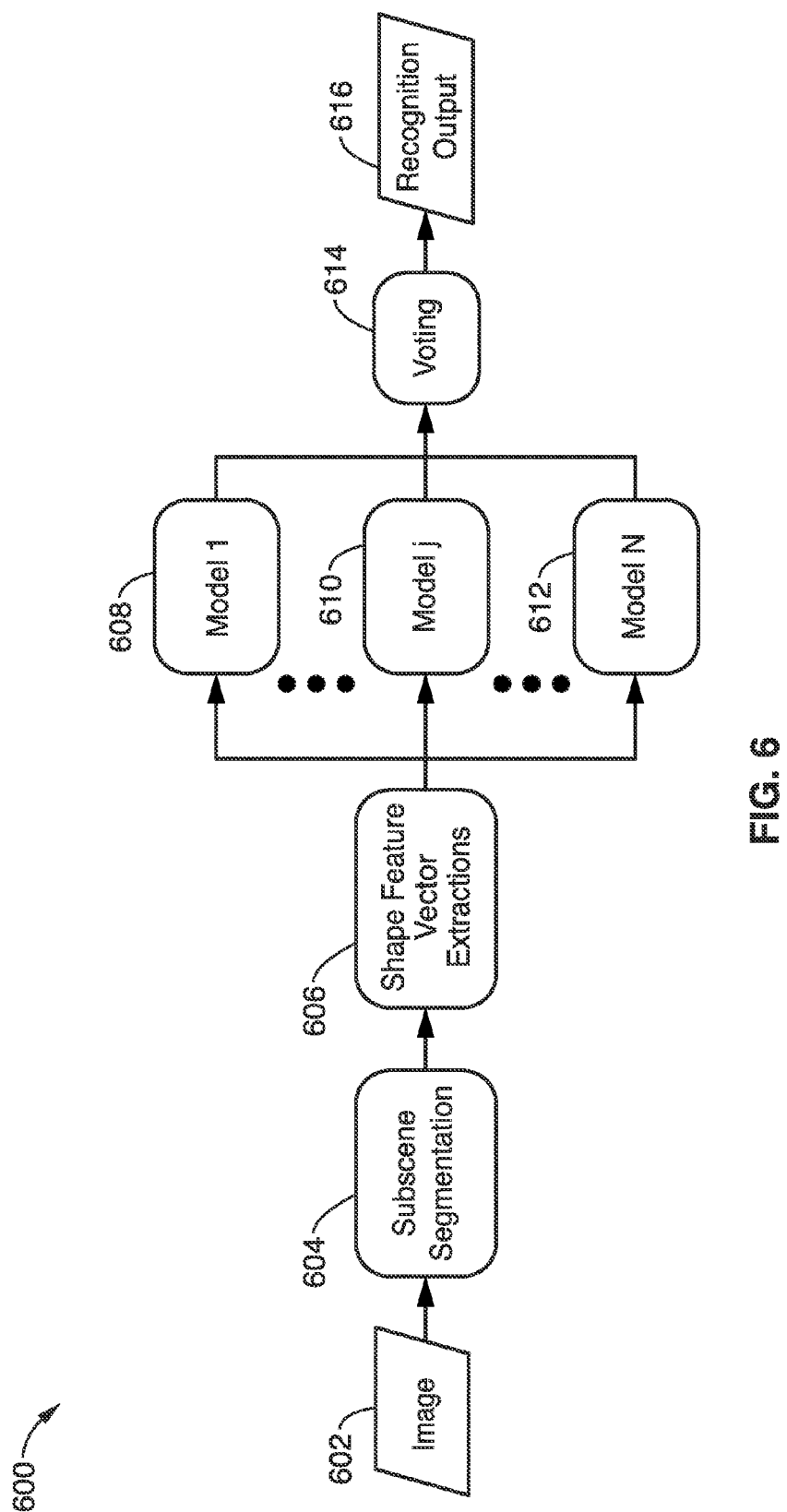
FIG. 6 is a flow chart of the image shape modeling based recognition method.

Refer now to FIG. 6, which is a flowchart of the overall subscene recognition scheme described herein 600. It can be applied as follows:

1. Given an input image 602, segment 604 the input image 602 into a set of subscenes. Any good segmentation technique may be used to perform the segmentation.

2. For each subscene, a subscene feature vector, including a top level shape feature vector $\vec{V}_{Top}$ and a division level shape feature vector $\vec{V}_{Division}$ are extracted in the shape feature vector extraction module 606 to form a subscene feature vector $\vec{V}_{subscene}$.

3. After a shape feature vector $\vec{V}_{subscene}$ is formed, it is used as input into different subscene models, from Model 1 608, to Model j 610, to Model N 612 of N models (where $1 \leq j \leq N$). Each model has a corresponding calculated output as follows:

$$O_i = \frac{1}{1 + e^{-CP}}$$

where i is an index for the model of the specified subscene category, C is a constant parameter and P is calculated as:

$$P = \log(P(\vec{V}_{subscene}; \vec{M}_k, [S_k], w_k))$$

where k is the index for the selected cluster in the Gaussian mixture model, $\vec{M}_k$ is the mean vector, $[S_k]$ is the covariance matrix, and $w_k$ is the weight of $k^{th}$ cluster.

After all the subscene model outputs are obtained, the subscene model with the maximum output is selected in the voting block 614 as the recognition output 616 by $$\underset{i}{\operatorname{argmax}}(O_0, O_1, \ldots, O_k, \ldots, O_N).$$

The above procedure is continued until all the subscenes are processed in the image. Clearly, the above procedure may be parallelized for increased computational speed by simultaneously processing many subscenes in an image.

F. Examples of Shape Recognition.

The methods disclosed herein were tested on the ETH-80 database (found at http://people.csail.mit.edu/jjl/libpmk/samples/eth.html) that contains artificially created images with essentially perfect shape information. In Table 1, the subscene recognition results of the 6 subscene categories are listed. It was obtained by training on half of the images on the database and testing on the entire database.

Refer now to FIGS. 7A-7F, which are computer generated example images of each training categories, respectively a cup, dog, horse, pear, cow, apple, and an apple.

Refer now to FIG. 8, which is a bar graph of recall and precision of an images database represented in FIGS. 7A through 7F when using the methods described herein. Generally, it may be seen that both precision and recall are better than 90%.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, parallel processing video or other coprocessor, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s)

From the discussion above it will be appreciated that the invention can be embodied in various ways, including the following:

1. An image classification apparatus, comprising: a computer; and means for shape classifying an input image using the computer.

2. The image classification apparatus of embodiment 1, wherein the means for shape classifying comprises programming executable on the computer for performing steps comprising: subscene modeling; and subscene recognition.

3. The image classification apparatus of embodiment 2, wherein the subscene modeling step comprises: segmenting a training image, from an image training set, into one or more training subscenes based on an input pool of N training subscene categories; extracting a set of training subscene feature vectors for each of the subscenes corresponding to the input pool of N training subscene categories; and forming a subscene model pool comprising training subscene feature vectors for each of the input pool of N training subscene categories.

4. The image classification apparatus of embodiment 1, wherein the computer is capable of executing the means for shape classifying either sequentially or at least partially in parallel.

5. The image classification apparatus of embodiment 3, wherein the subscene recognition step comprises: segmenting the input image into a set of input subscenes; extracting shape features corresponding to each of the input subscenes to form a set of extracted subscene shape feature vectors; and filtering the set of extracted subscene shape feature vectors against the subscene model pool to form a filtered output.

6. The image classification apparatus of embodiment 5, wherein the subscene recognition step further comprises selecting the set of extracted subscene categories corresponding to one or more of the largest filtered outputs.

7. The image classification apparatus of embodiment 5, wherein the subscene recognition step further comprises: setting a working subscene selected from the group consisting of the training subscenes, and the input subscenes; dividing the working subscene into a set of divisions; and describing the working subscene by a concatenated subscene shape feature vector $\vec{V}_{subscene}=(\vec{V}_{Top},\vec{V}_{Division})$ comprising: a top level feature vector $\vec{V}_{Top}$; and a division level feature vector $\vec{V}_{Division}$.

8. The image classification apparatus of embodiment 7, wherein the top level feature vector $\vec{V}_{Top}$ is calculated for each working subscene by performing steps comprising: forming a bounding box surrounding the working subscene; detecting a set of working subscene edge points and their associated gradients within the bounding box in the luminance channel (Y domain); and calculating a 5-dimensional (5D) top level feature vector, comprising: $\vec{V}_{Top}=(f_{Compactness},f_{Horizontal},f_{45°},f_{Vertical},f_{135°})$, where, in the bounding box, $f_{Compactness}$ is calculated by $$f_{Compactness} = \frac{N}{|X_A - X_B| * |Y_A - Y_B|},$$

$f_{Horizontal}$ is a normalized number of horizontal edge points $$f_{Horizontal} = \frac{N_{Horizontal}}{N_{Normalization}},$$

$f_{45°}$ is a normalized number of 45° edge points $$f_{45°} = \frac{N_{45°}}{N_{Normalization}},$$

$f_{Vertical}$ is a normalized number of vertical edge points $$f_{Vertical} = \frac{N_{Vertical}}{N_{Normalization}},$$

$f_{135°}$ is a normalized number of 135° edge points $$f_{135°} = \frac{N_{135°}}{N_{Normalization}},$$

and $N_{Normalization}$ is a normalization factor that is the larger of a length of a height or width of the bounding box:

$$N_{Normalization} = \begin{cases} |X_A - X_B| & \text{if}|X_A - X_B| \geq |Y_A - Y_B| \\ |Y_A - Y_B| & \text{if}|X_A - X_B| < |Y_A - Y_B| \end{cases}$$

where N denotes the total number of pixels of the working subscene in the bounding box, $(X_A, Y_A)$ denotes an upper left corner position of the bounding box; and $(X_B, Y_B)$ denotes a lower right corner position of the bounding box.

9. The image classification apparatus of embodiment 8, wherein each subscene edge point is classified as: a horizontal edge point if the associated gradient lies between −22.5° and 22.5°; a vertical edge point if the associated gradient lies between 67.5° and 112.5°; a 45° edge point if the associated gradient lies between 22.5° and 67.5°; and a 135° edge point if the associated gradient lies between 112.5° and 157.5°.

10. The image classification apparatus of embodiment 7, wherein the subscene recognition step further comprises: dividing a bounding box surrounding the working subscene into three horizontal and three vertical subscene divisions $D_i$, where i∈1, 2, 3, 4, 5, 6, 7, 8, 9; detecting a set of division edge points of the working subscene and their associated gradients within each subscene division in the luminance channel (Y domain); and forming a 5-dimensional (5D) division feature vector $\vec{D}_i=(f_{Compactness},f_{Horizontal},f_{45°},f_{Vertical},f_{135°})|_{D_i}$ for each of the i subscene divisions, where, in subscene division $D_i$, $f_{Compactness}$ is calculated by $$f_{Compactness} = \frac{N}{|X_A - X_B| * |Y_A - Y_B|},$$

$f_{Horizontal}$ is a normalized number of horizontal edge points $$f_{Horizontal} = \frac{N_{Horizontal}}{N_{Normalization}},$$

$f_{45°}$ is a normalized number of 45° edge points $$f_{45°} = \frac{N_{45°}}{N_{Normalization}},$$

$f_{Vertical}$ is a normalized number of vertical edge points $$f_{Vertical} = \frac{N_{Vertical}}{N_{Normalization}},$$

$f_{135°}$ is a normalized number of 135° edge points $$f_{135°} = \frac{N_{135°}}{N_{Normalization}},$$

and $N_{Normalization}$ is a normalization factor that is the larger of a length of a height or width of the subscene division:

$$N_{Normalization} = \begin{cases} |X_A - X_B| & \text{if } |X_A - X_B| \geq |Y_A - Y_B| \\ |Y_A - Y_B| & \text{if } |X_A - X_B| < |Y_A - Y_B| \end{cases}$$

where N denotes the total number of working subscene pixels in the subscene division, $(X_A, Y_A)$ denotes an upper left corner position of the subscene division; and $(X_B, Y_B)$ denotes a lower right corner position of the subscene division.

11. The image classification apparatus of embodiment 10, wherein each working subscene division edge point is classified as: a horizontal edge point if the associated gradient lies between −22.5° and 22.5°; a vertical edge point if the associated gradient lies between 67.5° and 112.5°; a 45° edge point if the associated gradient lies between 22.5° and 67.5°; and a 135° edge point if the associated gradient lies between 112.5° and 157.5°.

12. The image classification apparatus of embodiment 10, wherein the subscene recognition step further comprises forming the concatenated 45-dimensional (45D) division level feature vector from the 9 individual 5D division feature vectors as: $\vec{V}_{Division} = (\vec{D}_1, \vec{D}_2, \vec{D}_3, \vec{D}_4, \vec{D}_5, \vec{D}_6, \vec{D}_7, \vec{D}_8, \vec{D}_9)$ 13. The image classification apparatus of embodiment 8, wherein the detecting step comprises using Canny edge detection.

14. The image classification apparatus of embodiment 3, wherein the subscene modeling step comprises selecting an optimal number of clusters in the step of forming the subscene model pool.

15. The image classification apparatus of embodiment 1, wherein the means for shape classifying is stored on a computer readable medium.

16. The image classification apparatus of embodiment 2, wherein the input image is one of a set of photographs.

17. An image classification apparatus, comprising: (a) a computer; and (b) programming executable on the computer for shape classifying an input image by performing steps comprising: (i) subscene recognition; and (ii) subscene modeling; (c) wherein said subscene modeling comprises: segmenting a training image, from an image training set, into one or more subscenes based on an input pool of N training subscene categories; extracting a set of training subscene feature vectors for each of the subscenes corresponding to the input pool of N training subscene categories; and forming a subscene model pool comprising subscene feature vectors for each of the input pool of N training subscene categories.

18. The image classification apparatus of embodiment 17, wherein the programming executable is stored on a computer readable medium as a program in either source code or object code.

19. An image classification apparatus, comprising: a computer; and programming executable on the computer for shape classifying an input image by performing steps comprising: subscene modeling; and subscene recognition.

20. A computer readable medium containing the programming recited in embodiment 19 in computer executable form.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

|  | cup | dog | horse | pear | cow | apple | Recall |
| --- | --- | --- | --- | --- | --- | --- | --- |
| cup | 410 | 0 | 0 | 0 | 0 | 0 | 100% |
| dog | 0 | 361 | 33 | 0 | 15 | 0 | 88.10% |
| horse | 0 | 6 | 386 | 0 | 17 | 0 | 94.10% |
| pear | 0 | 0 | 0 | 410 | 0 | 0 | 100% |
| cow | 0 | 3 | 11 | 0 | 396 | 0 | 96.50% |
| apple | 0 | 0 | 0 | 0 | 0 | 408 | 99.50% |
| Precision | 99.20% | 97.50% | 89.70% | 100% | 91.20% | 100% |  |

What is claimed is:

1. An image classification apparatus, comprising:
a computer; and
programming executable on the computer for shape classifying an input image by performing steps comprising:
 (a) performing subscene modeling by:
  (i) segmenting a training image, from an image training set, into one or more training subscenes based on an input pool of N training subscene categories;
  (ii) extracting a set of training subscene feature vectors for each of the subscenes corresponding to the input pool of N training subscene categories; and
  (iii) forming a subscene model pool comprising training subscene feature vectors for each of the input pool of N training subscene categories;
 (b) performing subscene recognition by:
  (i) segmenting the input image into a set of input subscenes;
  (ii) extracting shape features corresponding to each of the input subscenes to form a set of extracted subscene shape feature vectors;

(iii) filtering the set of extracted subscene shape feature vectors against the subscene model pool to form a filtered output;
(iv) setting a working subscene selected from the group consisting of the training subscenes, and the input subscenes;
(v) dividing the working subscene into a set of divisions; and
(vi) describing the working subscene by a concatenated subscene shape feature vector $\vec{V}_{subscene} = (\vec{V}_{Top}, \vec{V}_{Division})$ comprising:
a top level feature vector $\vec{V}_{Top}$; and
a division level feature vector $\vec{V}_{Division}$;
(c) wherein the top level feature vector $\vec{V}_{Top}$ is calculated for each working subscene by performing steps comprising:
(i) forming a bounding box surrounding the working subscene;
(ii) detecting a set of working subscene edge points and their associated gradients within the bounding box in the luminance channel (Y domain); and
(iii) calculating a 5-dimensional (5D) top level feature vector, comprising:

$\vec{V}_{Top} = (f_{Compactness}, f_{Horizontal}, f_{45°}, f_{Vertical}, f_{135°})$, where, in the bounding box,
$f_{Compactness}$ is calculated by $$f_{Compactness} = \frac{N}{|X_A - X_B| * |Y_G - Y_B|},$$

$f_{Horizontal}$ is a normalized number of horizontal edge points $$f_{Horizontal} = \frac{N_{Horizontal}}{N_{Normalization}},$$

$f_{45°}$ normalized number of 45° edge points $$f_{45°} = \frac{N_{45°}}{N_{Normalization}},$$

$f_{Vertical}$ is a normalized number of vertical edge points $$f_{Vertical} = \frac{N_{Vertical}}{N_{Normalization}},$$

$f_{135°}$ is a normalized number of 135° edge points $$f_{135°} = \frac{N_{135°}}{N_{Normalization}},$$

and
$N_{Normalization}$ is a normalization factor that is the larger of a length of a height or width of the bounding box $$N_{Normalization} = \begin{cases} |X_A - X_B| & \text{if } |X_A - X_B| \geq |Y_A - Y_B| \\ |Y_A - Y_B| & \text{if } |X_A - X_B| < |Y_A - Y_B| \end{cases}$$

where N denotes the total number of pixels of the working subscene in the bounding box, $(X_A, Y_A)$ denotes an upper left corner position of the bounding box; and $(X_B, Y_B)$ denotes a lower right corner position of the bounding box.

2. The image classification apparatus of claim 1, wherein the subscene recognition step further comprises selecting the set of extracted subscene categories corresponding to one or more of the largest filtered outputs.

3. The image classification apparatus of claim 1, wherein each subscene edge point is classified as:
a horizontal edge point if the associated gradient lies between −22.5° and 22.5°;
a vertical edge point if the associated gradient lies between 67.5° and 112.5°;
a 45° edge point if the associated gradient lies between 22.5° and 67.5°; and
a 135° edge point if the associated gradient lies between 112.5° and 157.5°.

4. The image classification apparatus of claim 1, wherein the subscene recognition step further comprises:
dividing a bounding box surrounding the working subscene into three horizontal and three vertical subscene divisions $D_i$, where $i \in 1,2,3,4,5,6,7,8,9$;
detecting a set of division edge points of the working subscene and their associated gradients within each subscene division in the luminance channel (Y domain); and
forming a 5-dimensional (5D) division feature vector $\vec{D}_i = (f_{Compactness}, f_{Horizontal}, f_{45°}, f_{Vertical}, f_{135°})|_{D_i}$ for each of the i subscene divisions, where, in subscene division $D_i$,
$f_{Compactness}$ is calculated by $$f_{Compactness} = \frac{N}{|X_A - X_B| * |Y_A - Y_B|},$$

$f_{Horizontal}$ is a normalized number of horizontal edge points $$f_{Horizontal} = \frac{N_{Horizontal}}{N_{Normalization}},$$

$f_{45°}$ is a normalized number of 45° edge points $$f_{45°} = \frac{N_{45°}}{N_{Normalization}},$$

$f_{Vertical}$ is a normalized number of vertical edge points $$f_{Vertical} = \frac{N_{Vertical}}{N_{Normalization}},$$

$f_{135°}$ is a normalized number of 135° edge points $$f_{135°} = \frac{N_{135°}}{N_{Normalization}},$$

and $N_{Normalization}$ is a normalization factor that is the larger of a length of a height or width of the subscene division:

$$N_{Normalization} = \begin{cases} |X_A - X_B| & \text{if } |X_A - X_B| \geq |Y_A - Y_B| \\ |Y_A - Y_B| & \text{if } |X_A - X_B| < |Y_A - Y_B| \end{cases}$$

where N denotes the total number of working subscene pixels in the subscene division, $(X_A, Y_A)$ denotes an upper left corner position of the subscene division; and $(X_B, Y_B)$ denotes a lower right corner position of the subscene division.

5. The image classification apparatus of claim 4, wherein each working subscene division edge point is classified as:
   a horizontal edge point if the associated gradient lies between −22.5° and 22.5°;
   a vertical edge point if the associated gradient lies between 67.5° and 112.5°;
   a 45° edge point if the associated gradient lies between 22.5° and 67.5°; and
   a 135° edge point if the associated gradient lies between 112.5° and 157.5°.

6. The image classification apparatus of claim 4, wherein the subscene recognition step further comprises forming the concatenated 45-dimensional (45D) division level feature vector from the 9 individual 5D division feature vectors as:

$$\vec{V}_{Division} = (\vec{D}_1, \vec{D}_2, \vec{D}_3, \vec{D}_4, \vec{D}_5, \vec{D}_6, \vec{D}_7, \vec{D}_8, \vec{D}_9).$$

7. The image classification apparatus of claim 1, wherein the detecting step comprises using Canny edge detection.

8. The image classification apparatus of claim 1, wherein the subscene modeling step comprises selecting an optimal number of clusters in the step of forming the subscene model pool.

9. The image classification apparatus of claim 1, wherein the programming is stored on a non-transitory computer readable medium.

10. The image classification apparatus of claim 1, wherein the input image is one of a set of photographs.

11. A method for image classification, comprising:
providing an input image; and
executing, on a computer, programming for shape classifying the input image by performing steps comprising:
   (a) performing subscene modeling by:
      (i) segmenting a training image, from an image training set, into one or more training subscenes based on an input pool of N training subscene categories;
      (ii) extracting a set of training subscene feature vectors for each of the subscenes corresponding to the input pool of N training subscene categories; and
      (iii) forming a subscene model pool comprising training subscene feature vectors for each of the input pool of N training subscene categories;
   (b) performing subscene recognition by:
      (i) segmenting the input image into a set of input subscenes;
      (ii) extracting shape features corresponding to each of the input subscenes to form a set of extracted subscene shape feature vectors;
      (iii) filtering the set of extracted subscene shape feature vectors against the subscene model pool to form a filtered output;
      (iv) setting a working subscene selected from the group consisting of the training subscenes, and the input subscenes;
      (v) dividing the working subscene into a set of divisions; and
      (vi) describing the working subscene by a concatenated subscene shape feature vector $\vec{V}_{subscene} = (\vec{V}_{Top}, \vec{V}_{Division})$ comprising:
         a top level feature vector $\vec{V}_{Top}$; and
         a division level feature vector $\vec{V}_{Division}$;
   (c) wherein the top level feature vector $\vec{V}_{Top}$ is calculated for each working subscene by performing steps comprising:
      (i) forming a bounding box surrounding the working subscene;
      (ii) detecting a set of working subscene edge points and their associated gradients within the bounding box in the luminance channel (Y domain); and
      (iii) calculating a 5-dimensional (5D) top level feature vector, comprising:

$$\vec{V}_{Top} = (f_{Compactness}, f_{Horizontal}, f_{45°}, f_{Vertical}, f_{135°}),$$

where, in the bounding box,
$f_{Compactness}$ is calculated by $$f_{Compactness} = \frac{N}{|X_A - X_B| * |Y_a - Y_B|},$$

$f_{Horizontal}$ is a normalized number of horizontal edge points $$f_{Horizontal} = \frac{N_{Horizontal}}{N_{Normalization}},$$

$f_{45°}$ is a normalized number of 45° edge points $$f_{45°} = \frac{N_{45°}}{N_{Normalization}},$$

$f_{Vertical}$ is a normalized number of vertical edge points $$f_{Vertical} = \frac{N_{Vertical}}{N_{Normalization}},$$

$f_{135°}$ is a normalized number of 135° edge points $$f_{135°} = \frac{N_{135°}}{N_{Normalization}},$$

and
$N_{Normalization}$ is a normalization factor that is the larger of a length of a height or width of the bounding box $$N_{Normalization} = \begin{cases} |X_A - X_B| & \text{if } |X_A - X_B| \geq |Y_A - Y_B| \\ |Y_A - Y_B| & \text{if } |X_A - X_B| < |Y_A - Y_B| \end{cases}$$

where N denotes the total number of pixels of the working subscene in the bounding box, $(X_A, Y_A)$ denotes an upper left corner position of the bounding box; and $(X_B, Y_B)$ denotes a lower right corner position of the bounding box.

12. The method of claim 11, wherein the subscene recognition step further comprises selecting the set of extracted subscene categories corresponding to one or more of the largest filtered outputs.

13. The method of claim 11, wherein each subscene edge point is classified as:
- a horizontal edge point if the associated gradient lies between −22.5° and 22.5°;
- a vertical edge point if the associated gradient lies between 67.5° and 112.5°;
- a 45° edge point if the associated gradient lies between 22.5° and 67.5°; and
- a 135° edge point if the associated gradient lies between 112.5° and 157.5°.

14. The method of claim 11, wherein the subscene recognition step further comprises:
- dividing a bounding box surrounding the working subscene into three horizontal and three vertical subscene divisions $D_i$, where $i \in 1,2,3,4,5,6,7,8,9$;
- detecting a set of division edge points of the working subscene and their associated gradients within each subscene division in the luminance channel (Y domain); and
- forming a 5-dimensional (5D) division feature vector $\vec{D}_i = (f_{Compactness}, f_{Horizontal}, f_{45°}, f_{Vertical}, f_{135°})|_{D_i}$ for each of the i subscene divisions, where, in subscene division $D_i$,
$f_{Compactness}$ is calculated by $$f_{Compactness} = \frac{N}{|X_A - X_B| * |Y_A - Y_B|},$$

$f_{Horizontal}$ is a normalized number of horizontal edge points $$f_{Horizontal} = \frac{N_{Horizontal}}{N_{Normalization}},$$

$f_{45°}$ is a normalized number of 45° edge points $$f_{45°} = \frac{N_{45°}}{N_{Normalization}},$$

$f_{Vertical}$ is a normalized number of vertical edge points $$f_{Vertical} = \frac{N_{Vertical}}{N_{Normalization}},$$

$f_{135°}$ is a normalized number of 135° edge points $$f_{135°} = \frac{N_{135°}}{N_{Normalization}},$$

and $N_{Normalization}$ is a normalization factor that is the larger of a length of a height or width of the subscene division $$N_{Normalization} = \begin{cases} |X_A - X_B| & \text{if } |X_A - X_B| \geq |Y_A - Y_B| \\ |Y_A - Y_B| & \text{if } |X_A - X_B| < |Y_A - Y_B| \end{cases}$$

where N denotes the total number of working subscene pixels in the subscene division, $(X_A, Y_A)$ denotes an upper left corner position of the subscene division; and $(X_B, Y_B)$ denotes a lower right corner position of the subscene division.

15. The method of claim 14, wherein each working subscene division edge point is classified as:
- a horizontal edge point if the associated gradient lies between −22.5° and 22.5°;
- a vertical edge point if the associated gradient lies between 67.5° and 112.5°;
- a 45° edge point if the associated gradient lies between 22.5° and 67.5°; and
- a 135° edge point if the associated gradient lies between 112.5° and 157.5°.

16. The method of claim 14, wherein the subscene recognition step further comprises forming the concatenated 45-dimensional (45D) division level feature vector from the 9 individual 5D division feature vectors as:

$\vec{V}_{Division} = (\vec{D}_1, \vec{D}_2, \vec{D}_3, \vec{D}_4, \vec{D}_5, \vec{D}_6, \vec{D}_7, \vec{D}_8, \vec{D}_9).$ 17. The method of claim 11, wherein the detecting step comprises using Canny edge detection.

18. The method of claim 11, wherein the subscene modeling step comprises selecting an optimal number of clusters in the step of forming the subscene model pool.

19. The method of claim 11, wherein the programming for shape classifying the input image is stored on a non-transitory computer readable medium.

20. The method of claim 11, wherein the input image is one of a set of photographs.

\* \* \* \* \*